Jan. 28, 1969    J. A. SUTHERLAND    3,423,932
WATER HEATING

Filed Aug. 1, 1967    Sheet 2 of 2

INVENTOR.
JOHN A. SUTHERLAND
BY
ATTORNEY

3,423,932
WATER HEATING
John A. Sutherland, Houston, Tex., assignor to Allied Chemical Corporation, New York, N.Y., a corporation of New York
Filed Aug. 1, 1967, Ser. No. 657,648
U.S. Cl. 60—39.56                      16 Claims
Int. Cl. F02c 7/00; F24h 1/34

ABSTRACT OF THE DISCLOSURE

A method of heating water to a temperature above 212° F. which includes the steps of heating the water as a result of heat exchange with turbine exhaust gas at atmospheric pressure.

---

Figure 1:
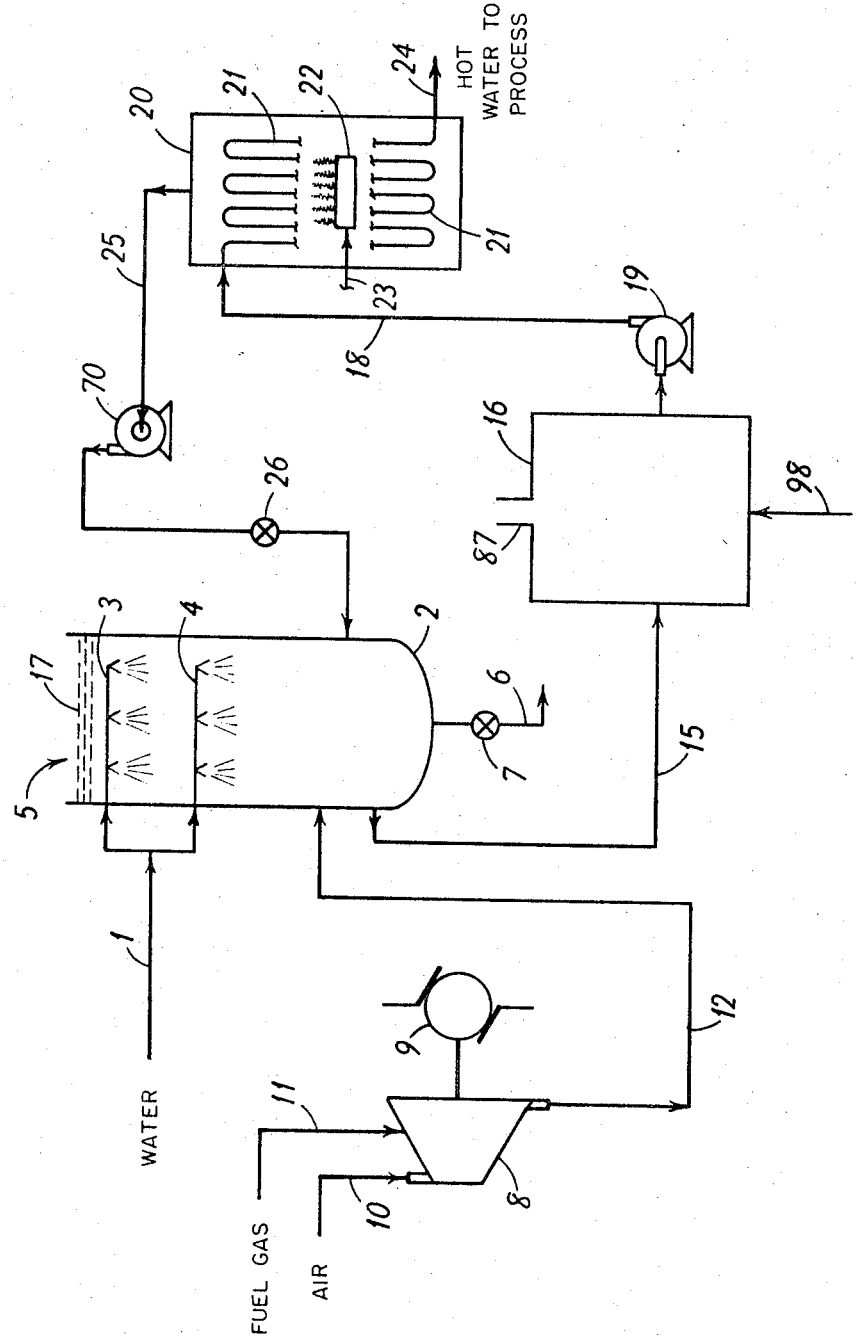

This invention relates to a process and apparatus especially useful for heating large quantities of water to temperatures well above 212° F., and preferably in the range of about 280–360° F., and is especially useful with a system utilizing the heat produced by gas turbine apparatus for the melting of underground deposits of sulfur by the Frasch process.

Many industrial processes require large quantities of hot water. Illustratively, sulfur mining requires large amounts of hot water heated approximately within the temperature range referred to in the preceding paragraph for the melting of the sulfur deposits below ground, and the transport of the molten sulfur from below ground level to a place of storage at ground level. One process utilizing the hot water as described in the preceding sentence is set forth in detail in U.S. Patent No. 1,628,873.

To operate a conventional plant producing water at temperatures above 212° F. as a result of the condensation of steam, is costly and cumbersome. Furthermore, in known processes producing the water at temperatures above 212° F. without employing steam, the introduction of carbon dioxide, oxygen or other impurities into the water as a result of submerged combustion heating of the water has a corrosive effect on the pipes through which the hot water flows. Since much of the work of the water is done below ground, as for example the melting of sulfur deposits by the process of U.S. Patent 1,628,873, it is of great advantage to reduce the corrosive effects of the water on the piping and equipment to as great an extent as possible, as well as to employ a more efficient hot water producing system. With this background information as to industrial requirements for a hot water producing system in mind, the following are some of the objects of this invention.

One of the main objectives of the present invention is to provide a process and apparatus which can be used to efficiently heat water with reduced corrosive content to a temperature in the range of about 280–360° F.

In this regard, a more specific objective of this invention is to heat water with the waste heat produced by a gas turbine power producing facility, without appreciably reducing the efficiency of the turbine.

A further object of this invention is to provide a process and apparatus for the efficient and economic production of water in the range of about 280°–360° F. with a minimum introduction of corrosive impurities such as oxygen, carbon dioxide or hydrocarbons.

A further object of this invention is to provide an efficient water heating process and apparatus without creating appreciable back pressure on the gas turbine apparatus from which heat is derived.

Further objects and advantages of this invention will be set forth in detail in the description which follows.

Generally, this invention entails the heating of water in an economizer column as a result of direct contact with waste gas from a gas turbine assembly and preferably hot flue gas from a water heater. The economizer column is provided with a disengaging device at the top thereof to deflect evolving aqueous mist back into the column and thus save both hot water and heat. Since the economizer column is open to the atmosphere, essentially no reducing back pressure condition is forced on the gas turbine assembly. The hot water produced by the economizer column is directed into a storage tank which in one preferable embodiment has provision for reducing the carbon dioxide and oxygen content of the hot water therein, to be described in more detail hereinafter. In addition, the hot water produced by the economizer column has been heated without the use of a supplemental combustion burner in the column, resulting in a lower oxygen, carbon dioxide and other impurity content (such as oxides of nitrogen hydrocarbons) than could otherwise be expected. Furthermore, the absence of appreciable back pressure makes possible the evolution from the water of more of the carbon dioxide, oxygen and other impurities than is possible otherwise. The hot water stored in the storage tank is pumped to the water heater where it is in heat exchange with the heat produced by a combustion heater, or other heating device. From there the hot water is directed into the industrial process in which it is to be employed, for example the process of U.S. Patent No. 1,628,873, commonly referred to as the Frasch process. The hot flue gas of the last mentioned heater is then preferably directed to the economizer column for efficient use in heating the water introduced therein, as previously mentioned and described in more detail hereinafter.

It is emphasized that although the process and apparatus generally described above and to be described in detail hereinafter is especially valuable in sulfur mining below the ground, as in the Frasch process of the referred to U.S. patent, the process and apparatus for producing hot water herein described is of advantage for any industrial system wherein hot water in quantity is required.

These and other objectives, features and advantages of the invention will become more apparent from the following description and drawings which are to be considered merely illustrative.

Figure 3:
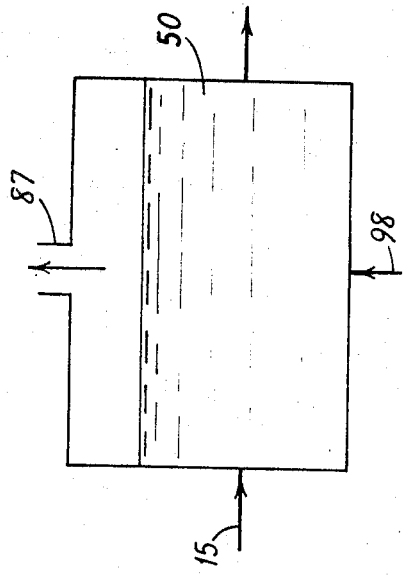
Figure 4:
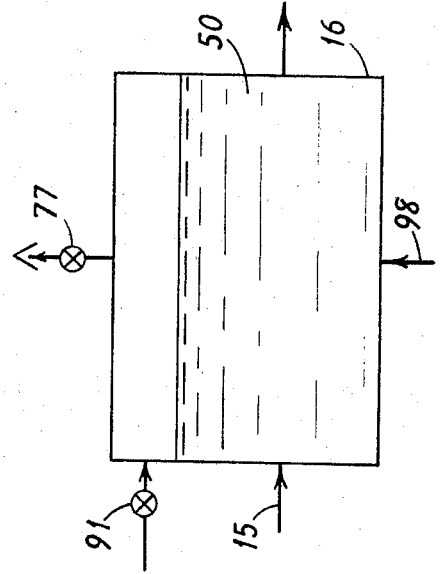
Figure 2:
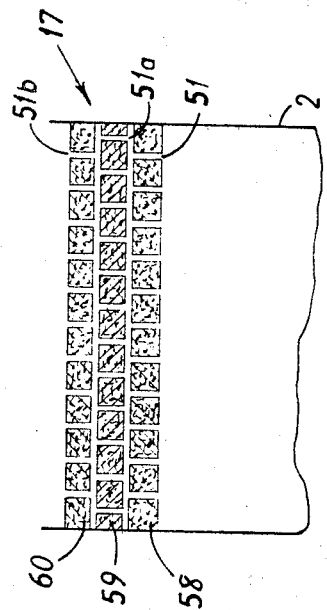
Figure 5:
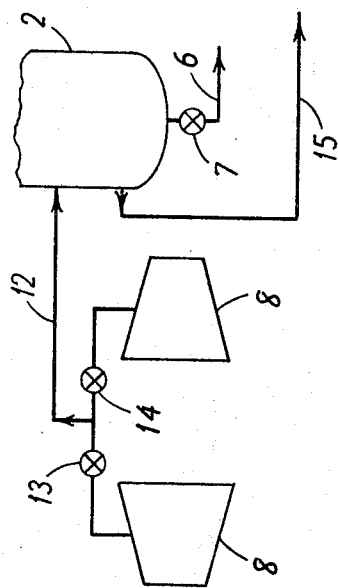

In the drawings:

FIGURE 1 is a schematic illustration of one form of the hot water process and apparatus of my invention; and FIGURE 2 is a more detailed but diagrammatic showing of the disengaging device in the economizer column; and FIGURE 3 is a showing of one embodiment of a hot water storage tank apparatus; and FIGURE 4 is a showing of a second embodiment of the hot water storage tank apparatus; and FIGURE 5 is an illustrative showing of a gas turbine assembly connection to the economizer column.

In the following description, reference should first be made to FIGURE 1. Like numerals in the showings of the various figures illustrate like parts.

Water near atmospheric temperature, in a range of about 40° F. to 120° F., is introduced through line 1 to the economizer column 2. Said water will be, for example, either derived from wells or other source at the site or stored while awaiting use. The water is preferably softened with, for example, a zeolite device (not shown) before being introduced into the column 2. The water is introduced into the economizer column 2 as a spray. As shown in FIGURE 1 a spray of water is introduced into the economizer near the top thereof. Such spray may be introduced as shown at 3 and at a point adjacent but further down the economizer column, shown at 4. The particular spray head utilized may be of any commercial variety, for example, the head sold by the Marley Company of Kansas City, Kans., Model No. 1002. Economizer column 2 is open to the atmosphere at the top 5 thereof and closed at the bottom except for the existence of a drain line 6 which is valved at at 7 to allow for drainage of the economizer column for cleaning, etc. at chosen intervals.

The water entering the economizer column through line 1 and spray heads 3 and 4, for example, is heated at a result of direct contact with exhaust gas emanating from the gas turbine or group of gas turbines generally indicated as a gas turbine assembly at 8. Said gas turbine assembly preferably is utilized to generate substantially all of the power requirements of the installation described. The generator(s) linked to the gas turbine assembly for that purpose are shown generally at 9. The gas turbine assembly is supplied, of course, with air and fuel gas, shown diagrammatically as through line 10 and line 11, respectively. Exhaust gas from the assembly 8 is directed by line 12 to the economizer column 2. The gas turbine or turbines employed may, for example, be of the Solar T–1000 Saturn gas turbine engine type (rated at 1000 H.P.). Other energy producing engines, for example reciprocating engines that also produce exhaust gas may be employed in place of the gas turbine described.

As shown in FIG. 5, exhaust gas line 12 is provided with minimum pressure drop valves 13 and 14 to insure that on startup and shutdown no back flow in line 12 from other heat sources to the economizer column is responsible for damage to the turbine or turbines 8.

Since the economized column 2 is open to the atmosphere at the top, no back pressure problem should occur.

The exhaust gas entering the economizer column through line 12 at or near the bottom thereof is at a temperature of in the range of about 500–1000° F., and usually about 600° F. The hot exhaust gas introduced into the economizer column rises and contacts the descending spray of water, from the spray heads 3 and 4, increasing its temperature in the range of about 20–140° F. and preferably to a temperature of about 160° F., at its exit point through line 15 to the hot water storage tank 16 to be described hereinafter.

At the top of the economizer column 2 is found a disengaging device 17 made, for example, of asbestos, which device serves to keep hot aqueous mist in the economizer column.

Said disengaging device 17 is shown with more particularity in FIGURE 2 and is composed of a series, preferably at least 3, of apertured shields 58, 59 and 60, extending approximately 8 inches along the longitudinal extent of the column, for example. The apertures in said shields, at 51, 51a and 51b, for example, are spaced in a non-aligned arrangement so that a substantial part of the mist rising in the economizer column 2 and passing through the apertures in shield 58 (say aperture 51) will be deflected by the shield thereabove, shield 59, back into the economizer column 2, thus holding the mist and the heat therein in the column. In a like manner, a substantial amount of the mist passing through aperture 51a in shield 59 will be deflected by shield 60. The fact that shield 60 is apertured, as shown at 51b for example, allows for free exchange with the atmosphere and atmospheric pressure conditons in the economizer column 2. In addition, the shields are preferably made wholly or in part of asbestos, resulting in high corrosion and thermal shock resistance, as well as heat insulation of the column. It has been found that about 90 to 100% of the mist can be held in the economizer column as a result of the use of the disengaging device 17 at the top thereof.

The heated water exiting through line 15 is stored in a hot water storage tank 16. Preferably, that hot water storage tank 16 is vented to the atmosphere through an open valve 87, as shown more specifically in FIGURE 3. Hot water used for heat in the installation, as for example to keep sulfur molten mined in the Frasch process, is aspirated through the hot water 50 in the storage tank 16 as a result of its introduction into the storage tank through line 98. This aspiration of hot water through the heated water 50 in the storage tank 16 serves to further heat the hot water in the tank 16, since the water in line 98 is at a temperature in the range of about 180° F. up to 212° F. and usually about 200° F. Furthermore, the aspiration relieves the water 50 in the hot water storage tank 16 of carbon dioxide and oxygen which it may have picked up from the exhaust gas which heated it in economizer column 2. In addition, sodium sulfite or equivalent may be added to the hot water 50 in the storage tank 16 to react with the oxygen in the water and make that water less corrosive. A catalyst may also be added to speed up the just described reaction, if desired.

Alternatively, the hot water tank 16 may be closed by a closed pressure valve 77 and under pressure, as shown in FIGURE 4. In that case, an inert gas, such as nitrogen or fuel gas, may be introduced above the water 50, as through valve 91, to blanket said water within the tank 16 so as to inhibit the absorption of oxygen and other corrosive elements. In the open system, however, as described with relation to FIGURE 3, the oxygen driven out of the water as a result of the aspiration is merely vented through the open vent 87, as shown by the arrow in FIGURE 3.

As needed, hot water is pumped from the storage tank 16 through line 18 by pump structure 19 into a conventional heater 20. In the heater 20, shown in FIGURE 1, the hot water in line 18 circulates through heat exchange pipe 21. The water in the pipe 21 is heated under pressure by direct application of flame from burner 22, for example, which is supplied with fuel gas from a source (not shown) through line 23. In the heater shown, the hot water from the pumped storage tank 16 is heated under pressure to a temperature of in the range of about 280° F. to 360° F. and usually about 320° F. and from a pressure of about 200 to 500 p.s.i.g., varying with use. Hot water under pressure and at the elevated temperature just indicated exits from the heater through line 24 to the process in which it is used. In the case of sulfur mining, as in the U.S. patent previously mentioned, the hot water is taken from the heater 20 and delivered underground to the mine for use in the process, as for example disclosed in Patent No. 1,628,873.

Preferably, hot flue gas from the heater 20 is blown by blower 70 through valve 26 to the economizer column 2 for use in heating the water which is introduced into the economizer column.

The heater 20 may be of any desired type, the details described above with relation to the water heater 20 shown being only illustrative of one type of heater preferred, said preferred heater not contributing corrosive impurities to the water heated under pressure in said heater. Such type of heater described is commercially available and is commercially known, for example, as the Econo-Therm heater of the Econo-Therm Corporation of Tulsa, Okla.

The use of exhaust gas from the turbine assembly 8 introduced into the economizer column 2 and hot flue gas from the heater 20 introduced into the economizer column 2 through line 25 results in a heating of the water sprayed into the economizer column without introduction of carbon dioxide, oxygen or other impurities which would be introduced with the combustion from a burner normally additionally provided in such a heating column under pressure. Furthermore, the provision of the disengaging device 17 in the top of the economizer column 2 results in a maximum saving of water and utilization of heat found in said economizer column, as previously described. The fact that the economizer column is open at the top allows for maximum turbine assembly efficiency, since there is no detrimental back pressure effect on the turbine. Furthermore, the aspirating of the hot water through the storage tank 16 water, preferably but not essentially with the introduction of sodium sulfite or equivalent compound, results in a recovery of additional heat and hot water finally heated in heater 20 and introduced into the process with a low amount of corrosive impurities.

Of course the hot water under pressure introduced from the heater 20 in the process described with relation to FIGURE 1 includes no complication of steam production or steam condensation to produce the hot water.

As a specific example, 1000 gal. per minute of water are sprayed into the economizer column 2 through spray heads 3 and 4. In one embodiment, the economizer column is about 9 feet in diameter, 48 feet high, and made of carbon steel. Preferably, the economizer column 2 is provided, for example, with a Gunnite (concrete) lining for protection of the column against corrosion and thermal shock, as well as improved heat insulation. Exhaust exits gas from 2 Solar T-1000 Saturn gas turbines at full power output and the flue gas from three Econo-Therm heaters rated at 42.05 million B.t.u. per hour heats the 1000 gal./minute of water introduced into the column to a temperature within the range previously discussed, and preferably about 160° F. Approximately 1000 gal. per minute of hot water exits from the economizer column and flows into hot water storage tank 16. The amount of water aspirated through the hot water in storage tank 16 through line 98, as described with relation to FIGURE 3, may vary with atmospheric temperature and process use. The range of volume of water aspirated through line 98 may be, for example, 50 to 100 gal. a minute. Hot water is pumped from the hot water storage tank 16 to the water heater 20 at a rate of about 1050 to 1100 gal. per minute, depending on the amount of water introduced through line 98, in FIGURE 3, and is heated in that water heater so as to be supplied at the elevated pressures and temperatures discussed earlier. Hot water is supplied through line 24 to the process at approximately 1050–1100 gal. per minute.

The flow rates and other figures described in the preceding paragraph are of course illustrative and may be varied as conditions warrant. The illustrative figures provided, however, do represent an operative embodiment of the process described.

It will be understood that temperatures and pressures and other specific data herein set forth including a recitation of specific apparatus, are given by way of example and that the present invention extends to all equivalents which will occur to those skilled in the art and which are covered by the following claims.

I claim:

1. A process for the production of water at a temperature in the range of about 280 to 360° F., the steps comprising directly contacting water at atmospheric pressure with hot exhaust gas from (1) a turbine assembly and (2) a water heater, storing said heated water in a hot water storage vessel, pumping said water from said hot water storage vessel to said water heater, and heating said water under pressure to a temperature in said temperature range in said water heater.

2. The process as set forth in claim 1, additionally including the step of disengaging aqueous mist venting into the atmosphere during the heating of the water as a result of contact with the exhaust gas so that both water and heat are contained within the process.

3. The process as set forth in claim 2 further including the step of aspirating hot water into said hot water storage vessel, and venting said vessel to the atmosphere so that impurities will be relieved from the hot water stored in the vessel.

4. The process as set forth in claim 3 further including the step of adding sodium sulfite to the water in said vessel to additionally remove oxygen impurity from the water.

5. The process as set forth in claim 4, said water heated as a result of the contact with exhaust gas to a temperature of about 160° F.

6. A process for the production of water at a temperature in the range of about 280 to 360° F., the steps comprising directly contacting water at atmospheric pressure with hot exhaust gas from a turbine assembly, storing said heated water in a hot water storage vessel, pumping said water from said hot water storage vessel to a water heater, heating said water under pressure to a temperature in said temperature range in said water heater, and disengaging aqueous mist venting into the atmosphere during the heating of the water as a result of contact with the exhaust gas so that both water and heat are contained within the process.

7. Apparatus for heating water comprising an economizer column having its longitudinal axis in vertical orientation, means for supplying hot exhaust gas from a turbine assembly to a lower end of the column, means for introducing in the lower end of the column waste gas from a water heater, said column being open to the atmosphere at the top thereof so as to substantially be at atmospheric pressure, means for introducing water into the column adjacent said top so that descending water will contact rising hot exhaust gas thus heating the descending water, a hot water storage vessel, means for directing the heated water from the bottom of the column to said vessel, and means for pumping hot water from the vessel to said water heater for elevation of water temperature to a temperature above 212° F.

8. Apparatus as set forth in claim 7 further including means at the top of the column for disengaging ascending aqueous mist and returning said mist into the column to hold hot water and heat in the column.

9. Apparatus as set forth in claim 8, said means at the top of column comprising a series of apertured shields arranged so as to be spaced on said longitudinal axis with the apertures of respective shields non-aligned.

10. Apparatus as set forth in claim 9, said descending water heated in the column to a temperature of about 160° F.

11. Apparatus as set forth in claim 7, said hot water storage vessel including means for aspirating hot water into the water contained in said vessel, said vessel being open to the atmosphere.

12. Apparatus as set forth in claim 8, said means for introducing water into the column comprising spray means at various levels on said longitudinal axis within the vertically-oriented economizer column.

13. Apparatus for heating water comprising an economizer column having its longitudinal axis in vertical orientation, means for supplying hot exhaust gas from a turbine assembly to a lower end of the column, means for introducing in the lower end of the column waste gas from a water heater, said column being open to the atmosphere at the top threof so as to substantially heat atmospheric pressure, means for introducing water into the column adjacent said top so that descending water will contact rising exhaust gas and be heated thereby, and means at the top of the column for disengaging ascending aqueous mist and returning said mist into the column to hold hot water and heat in the column.

14. Apparatus as set forth in claim 13, said means at the top of column comprising a series of apertured shields arranged so as to be spaced on said longitudinal axis with the apertures of respective shields non-aligned.

15. Apparatus as set forth in claim 14, said shields formed of asbestos material.

16. A method of heating water in a column open at the top so as to substantially heat said water at atmospheric pressure comprising the steps of spraying said water downwardly from an area adjacent the top of the column, contacting said downwardly directed water in said column with ascending hot exhaust gas, disengaging rising aqueous mist evolving as a result of such contact within said column, and returning said disengaged mist into the column.

References Cited

UNITED STATES PATENTS

| | | | |
|---|---|---|---|
| 1,560,806 | 11/1925 | Schuckher | 126—359 |
| 2,759,328 | 8/1956 | Cockrell | 60—39.56 |
| 2,875,749 | 3/1959 | Pettit et al. | 126—350 |
| 2,889,683 | 6/1959 | Miller | 60—39.57 |
| 3,352,298 | 11/1967 | Hope | 126—350 |

FREDERICK L. MATTESON, JR., *Primary Examiner.*

ROBERT A. DUA, *Assistant Examiner.*

U.S. Cl. X.R.

126—350